United States Patent [19]

Kobayashi et al.

[11] Patent Number: 4,986,244

[45] Date of Patent: Jan. 22, 1991

[54] INTERNAL COMBUSTION ENGINE

[75] Inventors: Junichi Kobayashi, Ushiku; Takashi Mizumori, Ibaraki, both of Japan

[73] Assignee: Hitachi, Ltd., Tokyo, Japan

[21] Appl. No.: 343,440

[22] Filed: Apr. 26, 1989

[30] Foreign Application Priority Data

Apr. 28, 1988 [JP] Japan .............................. 63-106592

[51] Int. Cl.[5] ...................... F02D 41/18; G01F 25/00

[52] U.S. Cl. .......................................... 123/488; 73/3; 73/118.2

[58] Field of Search ...................... 123/488, 494, 478; 73/118.2, 3

[56] References Cited

U.S. PATENT DOCUMENTS

| | | | |
|---|---|---|---|
| 4,264,961 | 4/1981 | Nishimura et al. | 123/494 |
| 4,644,474 | 2/1987 | Aposchanski et al. | 123/494 |
| 4,706,631 | 11/1987 | Wataya | 123/494 |

FOREIGN PATENT DOCUMENTS

| | | | |
|---|---|---|---|
| 0217391 | 4/1987 | European Pat. Off. . | |
| 54-76182 | 6/1979 | Japan . | |
| 59-190624 | 10/1984 | Japan . | |
| 63-275914 | 11/1988 | Japan | 73/118.2 |

OTHER PUBLICATIONS

Patent Abstracts of Japan, vol. 12, No. 315 (M-735)[3162], Aug. 26, 1988 & JP-A-63-88237.

Patent Abstracts of Japan, vol. 13, No. 6 (M-781)[3354], Jan. 9, 1989 & JP-A-63-215844.

Patent Abstracts of Japan, vol. 11, No. 258 (M-618) [2705], Aug. 21, 1987 & JP-A-62-63285.

*Primary Examiner*—Andrew M. Dolinar

*Attorney, Agent, or Firm*—Antonelli, Terry, Stout & Kraus

[57] ABSTRACT

An internal combustion engine has an intake air flowmeter which includes a first air flow rate computing means for computing the flow rate of intake air from an output of a hot-wire type air flowmeter in accordance with a first flow rate conversion function, a second air flow rate computing means for computing the intake air flow rate from data concerning a given opening degree of the throttle valve and measured engine speed in accordance with a second flow rate conversion function, and a calibration device for calibrating the first conversion function in accordance with the air flow rate computed by the second air flow rate computing means. When the extent of secular change due to contamination of the hot wire of the air flowmeter has exceeded a predetermined limit, the calibration device is put into effect to calibrate the first flow rate conversion function, so that the intake air flow rate can be measured with a high degree of accuracy without being influenced substantially by the secular change of the hot-wire type air flowmeter.

5 Claims, 3 Drawing Sheets

INTERNAL COMBUSTION ENGINE

BACKGROUND OF THE INVENTION

The present invention relates to an internal combustion engine having an intake air flowmeter capable of measuring the flow rate of intake air, improved to eliminate any undesirable effect of a secular change of the sensor caused by contamination of the surface of sensor element by contaminant particles such as dust and oil particles suspended in the intake air.

Current demands for a higher performance in internal combustion engines and a higher degree of cleaning of the exhaust gases from such engines require a higher degree of accuracy of air-fuel ratio control of the mixture. This in turn has given a rise to the demand for higher degrees of measuring precision and durability of the intake air flowmeter.

A hot-wire type flow sensor, for example, encounters a problem, in that the measuring accuracy is impaired by contaminants, such as dust particles sticking on the surface of the hot-wire sensor element. More specifically, this type of air flowmeter employs a heat-generating resistor, i.e., a hot-wire, placed in the stream of flowing air, such that the rate of heat radiation from the hot wire is changed in accordance with a change in the air flow rate. The heat-generating resistor constitutes one of four sides of a bridge circuit. The air flow rate therefore can be measured by detecting the voltage across the heat-generating resistor. The circuit is usually constructed such that the resistance value, i.e., the temperature, of the heat-generating resistor is maintained constant. The heat-generating resistor is made from a material having a resistance which has a large temperature dependency, e.g., platinum, nickel and so forth, in the form of a wire, foil or a film, independently or in the form of a coil on a bobbin made from ceramics, glass, a polyimide resin or an adhesion to a substrate. The heat-generating resistor in any of such forms will be generally referred to as a "hot wire" hereinafter.

Dust and other contaminants suspended in the intake air are allowed to stick on the hot wire so as to cause a change in the coefficient of heat transfer from the hot wire to the air, resulting in a change in the cooling characteristics of the hot wire. In consequence, the voltage across the hot wire as the sensor output, necessary for maintaining a constant resistance value of the hot wire, is undesirably changed even if the air flow rate is maintained constant. The determination of air flow rate employs a curve representing the relationship between the sensor output and the air flow rate. The output characteristic of the, sensor, however, experiences a secular change due to contaminants sticking on the hot wire as described above, so that the measuring accuracy of the air flowmeter is progressively degraded with the result that the precision of the air-fuel ratio control is impaired.

Various methods have been proposed to overcome this problem. For instance, Japanese Patent Unexamined Publication No. 54-76182 discloses a method in which a large electric current is supplied to the hot wire to raise its temperature to a level higher than the ordinary operation temperature and to burn the contaminants sticking on the surface of the hot wire. On the other hand, Japanese Patent Unexamined Publication No. 59-190624 discloses a method in which an obstacle is disposed upstream of the hot wire as viewed in the direction of flow of air, so as to reduce the amount of contaminants sticking on the hot wire.

However, the method which relies upon heating the hot wire up to a temperature higher than the ordinary operation temperature so as to burn the contaminants sticking on the surface of the hot wire is disadvantageous in that substances such as silicates contained in the dust particles are melted and vitrified so as to adhere to the hot wire surface more strongly and cause a change in the heat-radiation characteristic of the hot wire. On the other hand, the method which makes use of an obstacle upstream of the hot wire so as to reduce the amount of contaminants sticking on the hot wire encounters a problem in that a noise is incurred in the sensor output because the stream of air is disturbed by the presence of the obstacle which is immediately upstream of the hot wire.

Thus, these proposals for eliminating undesirable influence of secular changes in a hot-wire type air flowmeter cannot provide an appreciable effect and, hence, are still unsatisfactory.

SUMMARY OF THE INVENTION

Accordingly, an object of the present invention is to provide an internal combustion engine in which the air-fuel ratio of the mixture is controlled with a high degree of accuracy through a compensation for any secular change in the air flowmeter, thereby overcoming the above-described problems of the prior art.

To this end, according to the present invention, there is provided an internal combustion engine comprising an intake air flowmeter which includes a sensor for generating a flow rate signal corresponding to the flow rate of the intake air supplied to the internal combustion engine; first air flow rate computing means for receiving the flow rate signal and converting the same into a value of the intake air flow rate in accordance with a first flow rate conversion function; second intake air flow rate computing means for computing the flow rate of the intake air from the speed of the internal combustion engine in accordance with a second flow rate conversion function which defines the relationship between the speed and the flow rate of the intake air as obtained when an air flow rate control valve for controlling the flow rate of the intake air is fixed at a predetermined opening; and calibration means for calibrating the first flow rate conversion function in accordance with the value of the intake air flow rate computed by the second air flow rate computing means.

The second flow rate conversion function may incorporate also the temperature of the ambient air, the pressure of the atmosphere and the engine speed as parameters in addition to the flow rate of the intake air so that the second air flow rate computing means computes the intake air flow rate from the temperature of the ambient air, the pressure of the atmosphere and the engine speed, in accordance with the second flow rate conversion function.

The valve opening setting means for setting the intake air flow rate at a predetermined opening may include a spring which operates to fully close the air flow rate control valve during idling of the internal combustion engine, a wire through which the air flow rate control valve is connected to an accelerator pedal so that the opening of the air flow rate control valve is variable by means of the accelerator pedal, the wire being cut at an intermediate portion thereof, and a shape memory alloy connected between the cut ends of the wire, the shape memory alloy being controllable to selectively fully open the air flow rate control valve during idling.

The signal from the sensor corresponding to the intake air flow rate is input to the first flow rate computing means which computes the intake air flow rate in accordance with the first flow rate conversion function. On the other hand, the second flow rate computing means receives a signal representative of the engine speed under a condition where the air flow rate control valve is fixed at a predetermined opening, and computes the intake air flow rate in accordance with the second flow rate conversion function. The calibration means calibrates the first flow rate conversion function of the first air flow rate computing means on the basis of the intake air flow rate computed by the second air flow rate computing means.

When the second flow rate conversion function incorporates the ambient air temperature and the atmospheric pressure as the computing parameters in addition to the engine speed, the accuracy of determination of the intake air flow rate by the second air flow rate computing means is enhanced.

The air flow rate control valve is normally closed fully during idling of the engine. The shape memory alloy connected in the wire for operating the control current enables the air flow rate control valve to be forcibly opened to and fixed at the full open position during idling thereby enabling computation of the air flow rate by the second air flow rate computing means.

DESCRIPTION OF THE PREFERRED EMBODIMENT

A preferred embodiment of the present invention will be described with reference to FIGS. 1 to 4.

Figure 1:
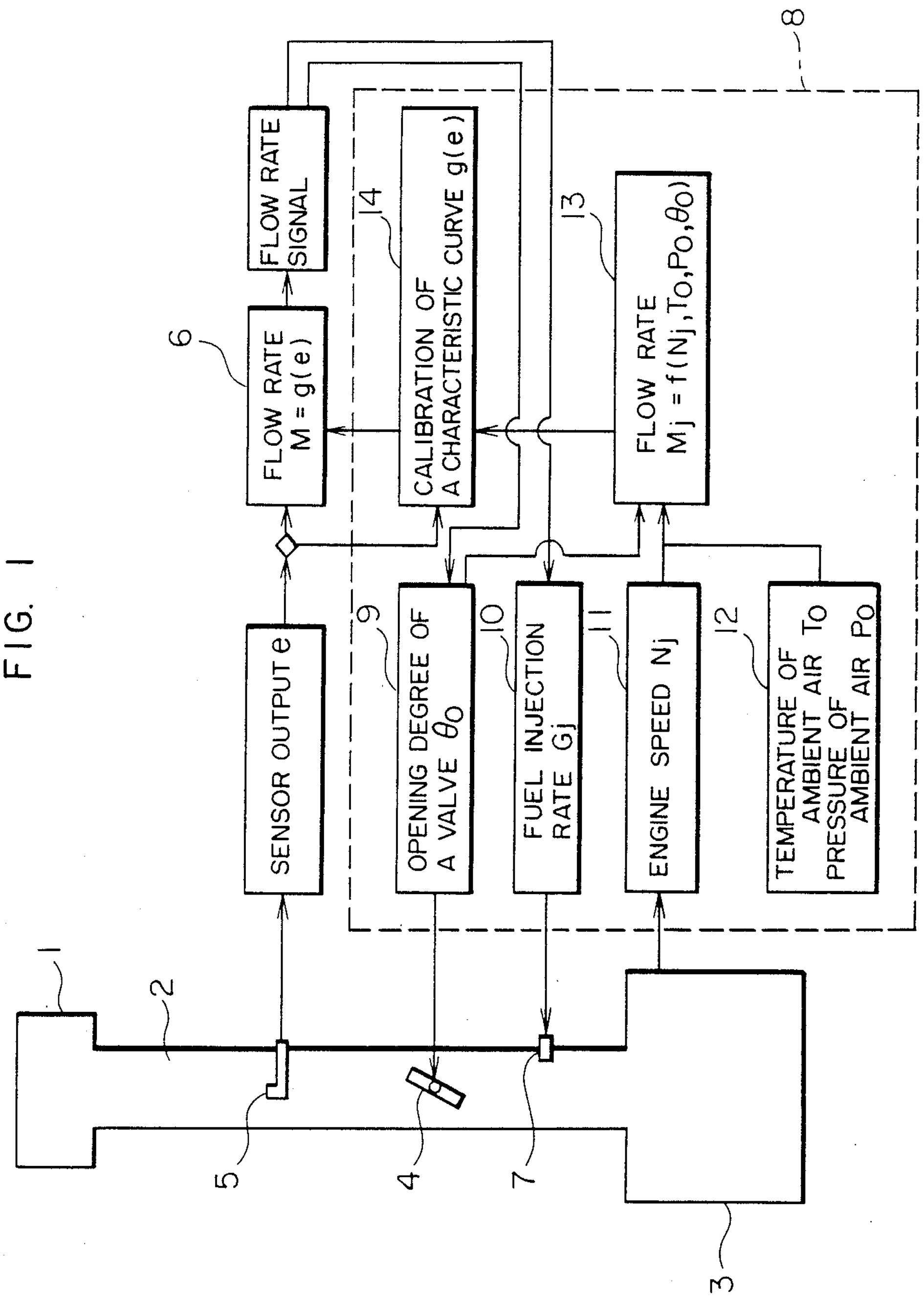
FIG. 1 is an illustration of an intake system of an internal combustion engine, shown together with a block diagram of a fuel injection system, a hot-wire type air flowmeter and a calibration device.

FIG. 1 synthetically shows parts constituting an intake passage of an internal combustion engine, together with a hot-wire type air flowmeter and a calibration device. Ambient air is sucked into a suction chamber 3 of the engine through an air intake 1 via a passage 2. A throttle valve 4 for controlling the flow rate of the intake air is disposed between the intake 1 and the suction chamber 3. The engine incorporates a hot-wire type air flowmeter of the type disclosed, for example, in the specification of U.S. Pat. No. 4,887,577, issued Dec. 19, 1989. This air flowmeter has a sensor element 5 disposed in the passage 2 at a position immediately upstream of the throttle valve 4. From the downstream of the throttle valve 4 is disposed a fuel injector 7 which may be of the type disclosed in the specification of the above mentioned U.S. Patent.

The flow rate of the intake air flowing through the passage 2 is usually determined in the form of a flow rate signal which is obtained by processing the output from the sensor element 5 through a converter 6 with a memory which stores a characteristic curve q showing the relationship between the output signal and the flow rate signal.

A description will be given of the calibration device 8. This device 8 is adapted to be put into operation manually or automatically during idling of the engine or cruising of an automobile carrying the engine, when the extent of the secular change of the hot-wire type air flowmeter has exceeded a predetermined value, e.g., when the total traveled distance of the automobile has exceeded a predetermined value or when the difference between the intake air flow rate determined from the throttle valve opening $\theta_0$ and the engine speed Nj and the flow rate measured by the sensor 5 has exceeded a predetermined limit.

When the calibration device 8 is put into operation, the opening degree of the throttle valve 4 is set at $\theta_0$ by a signal from a valve opening setting device 9. Then, the fuel injection rate is set to Gj by a signal given from the fuel injection rate setting device 10 while the throttle opening $\theta_0$ is maintained. As a result, the output from an engine speed sensor 11 is set to be constant at Nj. The engine speed Nj is input to a converter 13 which also receives signals $T_0$ and $P_0$ representing the temperature and the pressure of the ambient air derived from a temperature/pressure sensor 12 installed separately from the air flowmeter. The converter 13 has a memory which stores data concerning the air flow rate M at the throttle valve opening $\theta_0$ with parameters of a standard ambient air temperature $T_s$ and a standard atmospheric pressure $P_s$. Upon receipt of the signals representing the engine speed Nj and the temperature and pressure of the ambient air, therefore, the converter 13 computes the flow rate Mj which corresponds to the set values of the throttle valve opening $\theta_0$ and the engine speed Nj. The signal representing the thus determined flow rate Mj is sent to a characteristic curve calibration circuit 14 which also receives an output signal $e_j$ from the sensor element 5 of the hot-wire type flow sensor. Using these signals, the calibration circuit 14 forms a pair of calibration data.

This operation is repeated n times while varying the values of the fuel injection rate $G_j$ so that the relationship between the flow rate signal Mj and the sensor output $e_j$ is determined accordingly, recalibration of the characteristic curve q is conducted to determine a new characteristic curve. The calibration device 8 stops its operation after delivering the new characteristic curve to the converter 6.

A description will be given of the processes for the flow rate conversion and calibration of the characteristic curve, with reference to a flow chart shown in FIG. 2.

Figure 2:
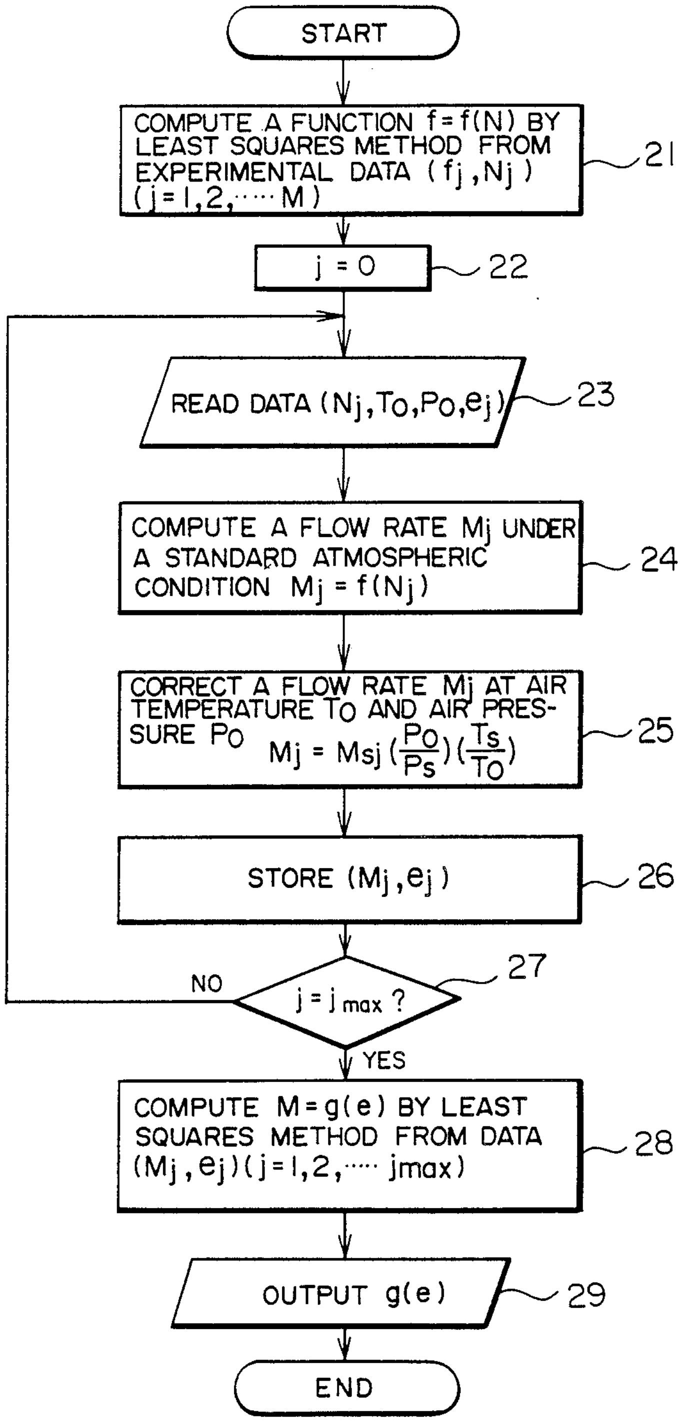
FIG. 2 is a flow chart showing a process for performing a flow rate conversion and calibration of a characteristic curve.

The flow shown in FIG. 2 is executed by the software of a microcomputer which constitutes the conversion device 13 and the characteristic curve calibration circuit 14 of FIG. 1.

In Step 21, a function f=f(N) representing the relationship between, the engine speed and the flow rate is computed by the least squares method, from previously input data concerning the engine speed Nj and the flow rate $f_j$ (j=1, 2, . . . , M) at the standard ambient air temperature and pressure $T_s$ and $P_s$. In Step 22, j is set to j=0, and the data necessary for the present air flow rate computation is input in Step 23. In Step 24, the flow rate Mj at the engine speed Nj under the standard atmospheric condition is determined in accordance with the formula Mj=f(Nj) and, in Step 25, the flow rate Nj at the air temperature $T_0$ is determined by correcting the flow rate Mj computed in Step 24. In Step 26, the flow rate Mj and the sensor output signal $e_j$ are stored as a set of data. In Step 27, the preceding steps 23 to 26 are repeated. The number of repetitions corresponds to the number $j_{max}$ of the data of the engine speed. Subsequently, using this data (Mj, $e_j$) (j=1, 2, . . . , jmax), the relationship between the flow rate M and the sensor output signal e, represented by M=g(e), is determined by the least squares method, whereby a new characteristic curve correctly representing the relationship between the sensor output and the intake air flow rate can be obtained.

The intake air flow rate is determined on the new characteristic curve by locating the sensor output e on this characteristic curve, and the fuel injector is controlled in accordance with the thus determined intake air flow rate so as to provide the desired air-fuel ratio of the mixture.

The above-described calibration can be accomplished in quite a short time so that it can be executed whenever the throttle valve opening of $\theta_0$ is detected during the running of the automobile. Alternatively, the calibration may be conducted with reference to a data map which stores data of the air flow rate Mj in relation to the throttle valve opening $\theta_0$ and the engine speed $N_j$.

When the requirement for the measuring accuracy is not so strict, the computation of the air flow rate may be executed on an assumption that the atmospheric pressure $P_0$ is constant. In such a case, the term of the pressure $P_0$ is omitted from the formula f for determining the flow rate, so that the formula can be simplified advantageously.

The formula f may be set in the factory at the time of assembly of the engine or, alternatively, it may be determined on the basis of the output signal from the sensor 5 in the running-in period after the start of use of the engine.

Figure 3:
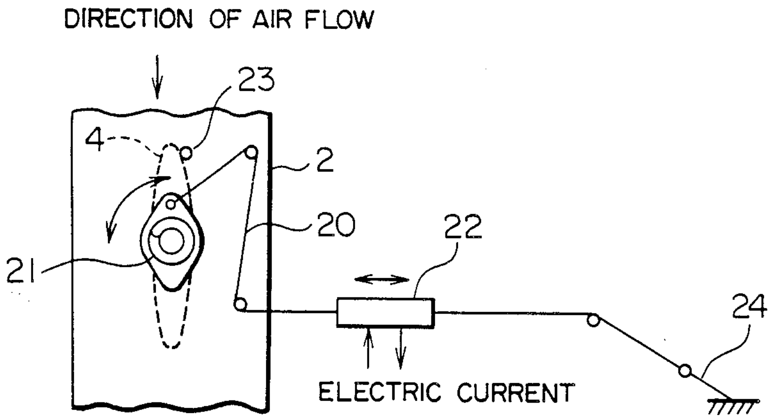
FIGS. 3 and 4 are schematic illustrations of a throttle valve opening setting device used in the arrangement of FIG. 1.

FIG. 3 illustrates a device for setting the throttle valve opening at $\theta_0$ (full opening). In general, when the engine is idling, the throttle valve 4 is kept in the full-close position by the force of a spring 21, because no tension is applied to the wire 20. However, when the calibration device 8 is put into operation, the shape memory alloy 22 constituting a portion of the wire 20 contracts due to heat generated as a result of supply of electrical power, so as to cause tension in the wire 20, whereby the throttle valve is opened against the force of the spring 21 and is fixed by a stopper 23 at the valve opening $\theta_0$ (full opening). The reference numeral 24 denotes an accelerator pedal.

Figure 4:
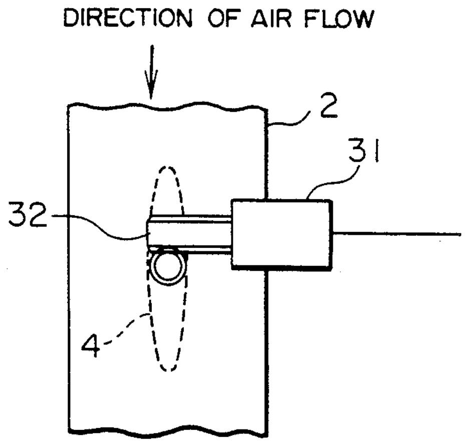

FIG. 4 shows an arrangement in which the throttle valve opening is controlled by an electric motor. Numeral 31 denotes the electric motor with a reduction gear 32. The throttle valve opening can be set freely by suitably setting the angle of rotation of the rotor of the electric motor.

The calibration of a hot-wire type air flowmeter would be possible by the use of a separate hot-wire type flow sensor intended exclusively for calibration or a Pitot-tube type flowmeter. These measures, however, are not recommended because the system is complicated due to duplication of the flow rate sensor.

In contrast, accordance with the present invention, the calibration can advantageously be enabled by a simple modification of parts which are originally installed on the engine. The use of hot-wire type air flowmeter eliminates the necessity for the provision of an $O_2$ sensor which is used for measuring the $O_2$ concentration in the exhaust gas.

As has been described, the intake air flow rate is determined from the engine speed while setting an air flow rate control valve at a constant opening during idling of an internal combustion engine. Simultaneously, the air flow rate is measured with the air flowmeter. The measuring characteristic of the air flow sensor is then calibrated on the basis of the intake air flow rate determined from the engine speed. It is therefore possible to avoid any deterioration in the measuring accuracy of the air flowmeter and, therefore, to precisely control the air-fuel ratio of the mixture to be fed to the engine. The accuracy of the calibration can be enhanced by adopting, in addition to the speed of the engine, the temperature and the pressure of the ambient air as parameters. The use of a shape memory alloy as a part of the member for actuating the air flow rate control valve provides a simple means for setting the valve to a predetermined opening during idling of the engine.

What is claimed is:

1. An internal combustion engine comprising: a sensor capable of generating a signal corresponding to the flow rate of intake air supplied to said internal combustion engine; first air flow rate computing means incorporating flow-rate conversion function for converting said signal into a value of the intake air flow rate; second air flow rate computing means capable of computing a value of the intake air flow rate at least from the opening of an air flow rate control valve for controlling the intake air flow rate, the temperature of the ambient air, the pressure of the atmosphere and the speed of said internal combustion engine; and a fuel injection device for injecting a fuel into the passage of the intake air; wherein said flow rate conversion function being calibrated in succession in accordance with the value of intake air flow rate computed by said second air flow rate computing means, and said fuel injection device is controlled in accordance with the value of the intake air flow rate computed by said first air flow rate computing means thereby controlling the air-fuel ratio of the mixture supplied to said internal combustion engine.

2. An internal combustion engine comprising an intake air flowmeter which includes: a sensor capable of generating a signal corresponding to the flow rate of intake air supplied to said internal combustion engine; first air flow rate computing means incorporating flow rate conversion function for converting said signal into a value of the intake air flow rate; and second air flow rate computing means capable of computing a value of the intake air flow rate at least from the opening of an air flow rate control valve for controlling the intake air flow rate, the temperature of the ambient air, the pressure of the atmosphere and the speed of said internal combustion engine; said flow rate conversion function being calibrated in succession in accordance with the value of intake air flow rate computed by said second air flow rate computing means.

3. An air flowmeter for an internal combustion engine comprising: a sensor for generating a signal corresponding to the flow rate of the intake air supplied to said internal combustion engine; first air flow rate computing means for receiving said signal and converting the same into a value of the intake air flow rate in accordance with a first flow rate conversion function; second air flow rate computing means for computing the flow rate of said intake air from the temperature of the ambient air, pressure of the atmosphere and the speed of said internal combustion engine in accordance with a second flow rate conversion function which defines the relationship between the temperature of the ambient air, pressure of the atmosphere and said speed and said intake air flow rate as obtained when an air flow rate control valve for controlling the flow rate of the intake air is fixed at a predetermined opening; and calibration means for calibrating said first flow rate conversion function in accordance with the value of the intake air flow rate computed by said second air flow rate computing means.

4. An air flowmeter according to claim 3, wherein the calibration of said first flow rate conversion function is effected when the difference between the value of the intake air flow rate computed by said first air flow rate computing means and that computed by said second air flow rate computing means has exceeded a predetermined allowable value.

5. An air flowmeter for an internal combustion engine comprising: a sensor for generating a signal corresponding to the flow rate of the intake air supplied to said internal combustion engine; first air flow rate computing means for receiving said signal and converting the same into a value of the intake air flow rate in accordance with a first flow rate conversion function; second air flow rate computing means for computing the flow rate of said intake air from the speed of said internal combustion engine in accordance with a second flow rate conversion function which defines the relationship between said speed and said intake air flow rate as obtained when an air flow rate control valve for controlling the flow rate of the intake air is fixed at a predetermined opening; calibration means for calibrating said first flow rate conversion function in accordance with the value of the intake air flow rate computed by said second air flow rate computing means; and valve opening setting means for setting said intake air flow rate at said predetermined opening, said valve opening setting means including a spring which operates ιo fully close said air flow rate control valve during idling of said internal combustion engine, a wire through which said air flow rate control valve is connected to an accelerator pedal so that the opening of said air flow rate control valve is made variable by means of said accelerator pedal, said wire being cut at an intermediate portion thereof, and a shape memory alloy connected between the cut ends of said wire, said shape memory alloy being controllable to selectively fully open said air flow rate control valve during idling.

* * * * *